UNITED STATES PATENT OFFICE.

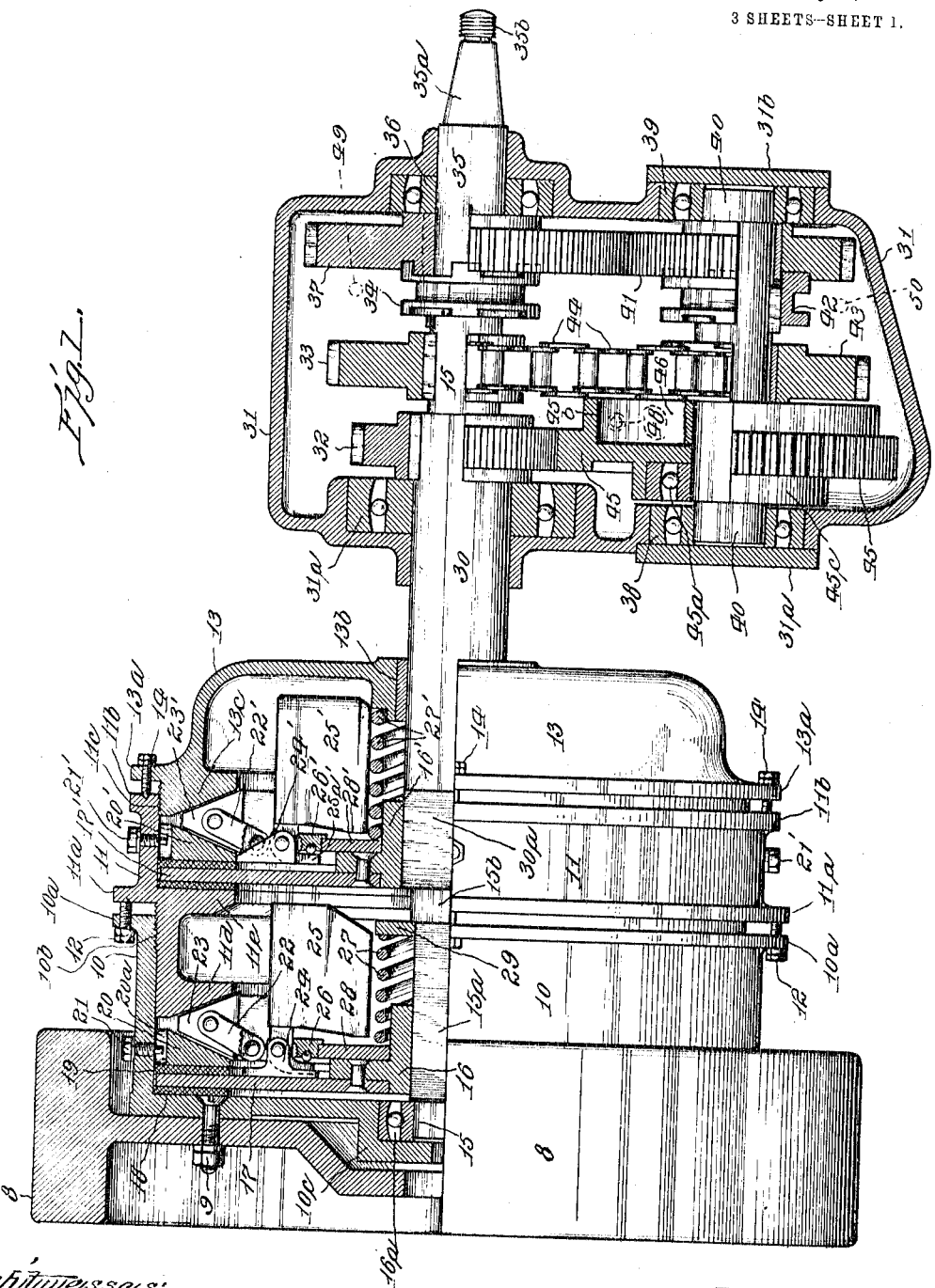

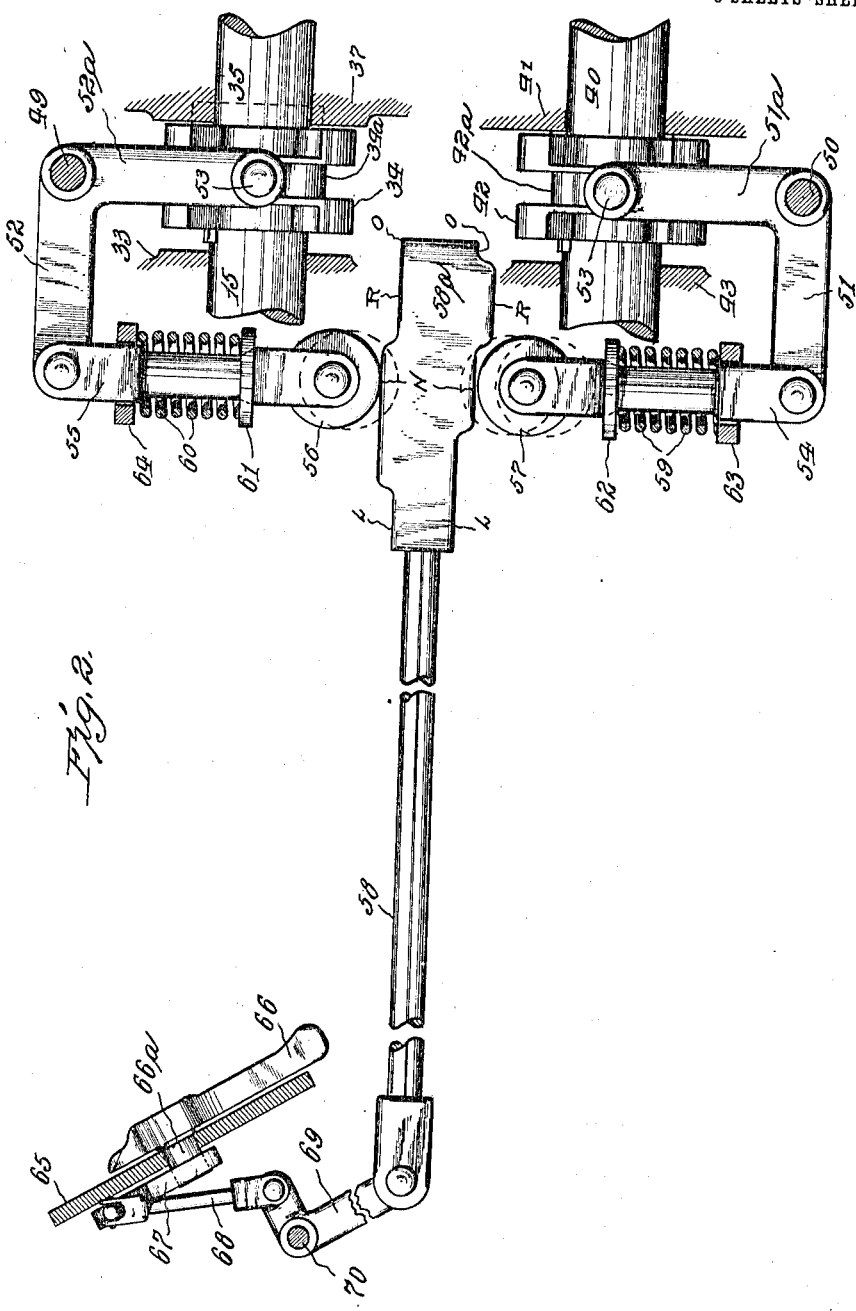

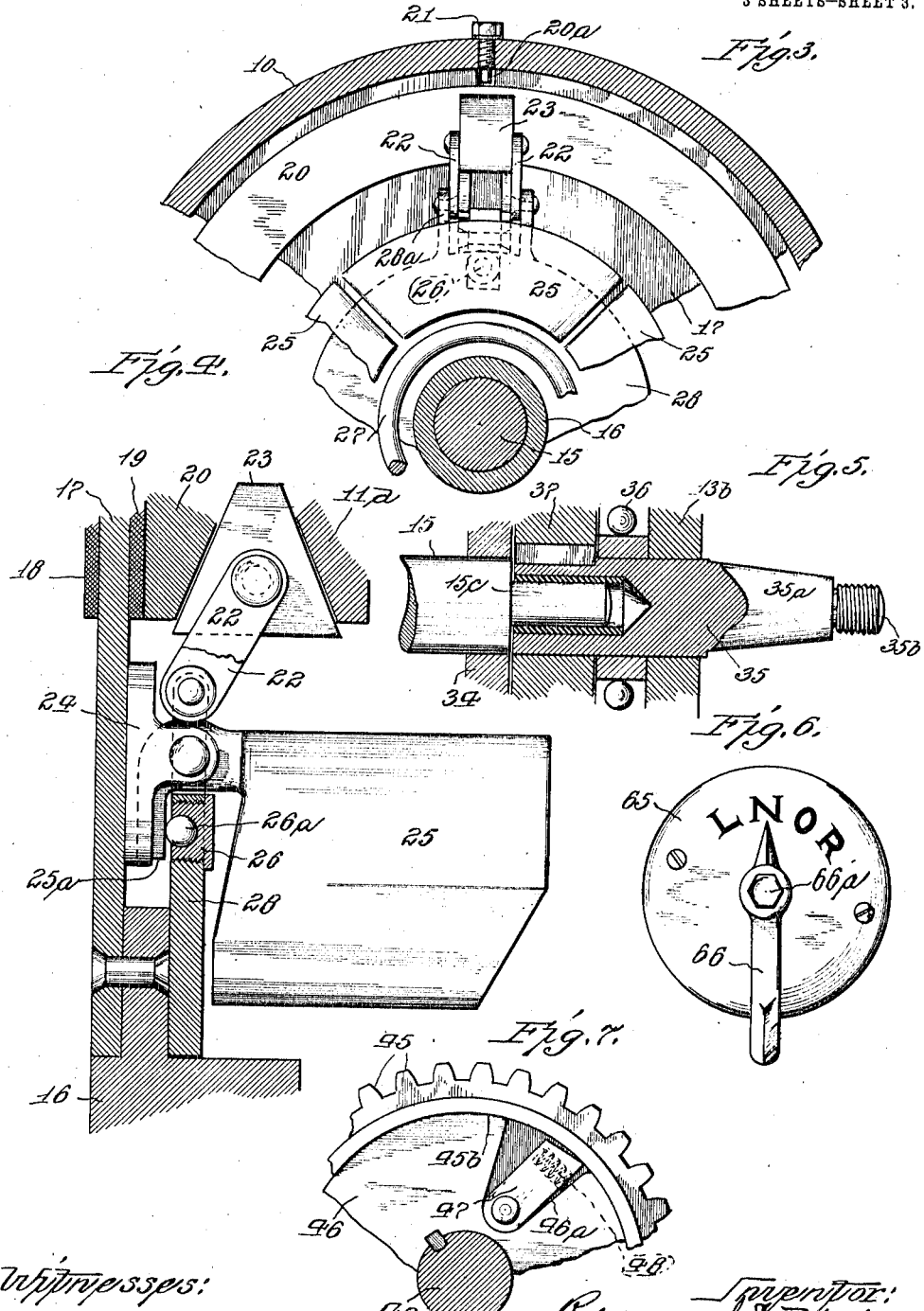

RAYMOND S. ZEITLER, OF URBANA, ILLINOIS.

TRANSMISSION-GEARING.

1,102,378.  Specification of Letters Patent.  Patented July 7, 1914.

Application filed September 4, 1913. Serial No. 788,087.

*To all whom it may concern:*

Be it known that I, RAYMOND S. ZEITLER, citizen of the United States, residing at Urbana, in the county of Champaign and State of Illinois, have invented certain new and useful Improvements in Transmission-Gearing, of which the following is a specification.

My invention relates to a form of automatic variable speed transmission gearing adapted to be most advantageously used in automobiles.

The chief object of my invention is to provide an apparatus of the character described, wherein the highest driving efficiency will be automatically obtained, and whereby every range of motor speed may be transmitted without the manual shifting of gears, as is the common practice.

Another object is to provide means that will automatically act, as a governor for controlling the speed of the motor, and thus prohibit same from racing.

Another object of my invention is to provide a transmission that will allow the motor or prime mover to start without load, and at a predetermined speed.

Further objects conserved by my invention are as follows:—All the transmission gears are constantly in mesh, thus insuring against excessive strains on individual gears. As changes from one speed to another are accomplished without clashing, gear stripping, and the shocks incident thereto, are avoided. The changes of speed are automatically effected by the variations in the load resulting from road grade resistance. The motor cannot be stalled, for when it is slowed down from any cause to a predetermined speed, say 200 R. P. M., the transmission is thereby automatically released and the motor runs free subject only to the control of the mechanism which acts as a governor.

Objects and advantages of my invention other than those above noted will be apparent to those skilled in the art and need not be specifically mentioned herein.

In the accompanying drawings, forming a part of this application, I have illustrated a preferred form of my device in the following views:—

Figure 1 is a view partly in side elevation and partially in section of my improved transmission, with the lever controlling means omitted; Fig. 2 is an elevation of the lever controlling means shown in operative connection with a pair of jaw clutches mounted on their respective shafts; Fig. 3 is a fragmental sectional view taken through one of the frictional clutches, and showing the relative arrangement of the parts immediately controlling the operation of the clutch; Fig. 4 is an enlarged fragmental view of that portion of Fig. 1 embodying the centrifugally controlled members, or governors, for operating the frictional or disk clutch; Fig. 5 is a fragmental section through the stud shaft shown in Fig. 1, showing its bearings; Fig. 6 is a top plan view of a form of dial and manual lever, adapted to be mounted upon the dash or any convenient portion of the vehicle in which my transmission is installed, and Fig. 7 is a fragmentary view of a portion of a slip gear or silent ratchet shown in Fig. 1, and forming an important element of my apparatus.

Similar reference characters refer to similar parts throughout the several views.

The reference character 8 designates a driven fly-wheel shown disassembled from its prime mover, the latter not being shown in the drawings. Secured to the web or spokes of the fly wheel, by bolts 9, is a hollow cylindrical casing 10, having an annular radial flange $10^a$, on its outer periphery, and internally threaded at $10^b$, to receive a somewhat similar casing 11, which also has an annular flange $11^a$, adjacent and corresponding to the flange $10^a$. A series of set screws 12 pass through suitably threaded openings in the flange $10^a$, and have their inner ends engage recesses in said flange $11^a$. At the opposite or outer end from the flange $11^a$, the casing 11 terminates in another annular flange $11^b$, which is internally threaded at $11^c$, to receive a cup-shaped cylindrical casing 13, having an annular flange $13^a$, opposite and adjacent the flange $11^b$, and spaced therefrom by set screws 14, passing through the flange $13^a$ at intervals around the same.

15 represents a shaft passing horizontally through the alined centers of the casings 10, 11 and 13, and journaled in a suitable frictionless bearing $16^a$, which is seated in a central and projecting hub $10^c$, on the casing 10. The shaft 15 is squared at $15^a$, a short distance from its bearing in the hub $10^c$, and slidably mounted on this squared shank, is a hub 16, riveted to a clutch disk 17, adapted to engage a raybestos collar 18, arranged on the inner vertical face of said casing 10, and also a similar raybestos collar, 19, secured to the opposite face of the collar 20, which is placed adjacent the collar 19, is tapering or wedge-shaped in cross-section and has a limited lateral, but non-rotatable movement through the engagement of set screws 21, passing through the wall of the casing 10, and entering transverse slots $20^a$, in the outer periphery of said ring, one of said screws only being shown in Fig. 1. The casing 11, after extending into the casing 10, for a distance, terminates in an internal flange $11^d$, having in its outer face the same angle of bevel as the adjacent face of the wedge ring 20, but in the opposite direction. Slidably mounted on the hub member 16, is a thrust-ring 28, having pivoted to lugs $28^a$ on its outer periphery, links 22, which are pivoted at their outer ends to, and support the wedge shaped thrust-blocks 23, as clearly shown in Figs. 1, 3 and 4.

Protruding from the flat disk 17, and rigidly secured thereto at points adjacent the links 22, are brackets 24, to which are pivoted the curved arms $25^a$, of weights 25. Said arms extend downwardly at right angles from their pivotal point, so that their inner faces come in contact with ball bearings $26^a$ seated in nuts 26 screwed into the thrust-ring 28. A coiled expansion spring ring 27, fits loosely around the hub of the hub member 16, and has one end abutting against the thrust-ring 28, and the other end abutting against a washer 29 fitted to the squared portion $15^a$ of the shaft 15, and resting against the shoulder $15^b$ of said shaft.

Assembled within the cylindrical casing 11, are members which are substantially duplicates of those just described in the casing 10, and which I will designate by corresponding reference characters with the addition of the prime mark. The disk 17' and hub 16', however, instead of being mounted directly upon the shaft 15, are mounted upon the squared portion $30^a$, of a sleeve 30, fitting loosely over said shaft, and having a bearing $13^b$, in the outer wall of said cup-shaped casing 13. The casing 11 is provided with an internal flange $11^e$, against which the clutch disk 17' frictionally engages. In this mechanism, the lugs 24' are parts of the thrust wedge ring 20', instead of being secured to the disk 17', as in the first described mechanism. In all other respects, the two friction clutch mechanisms in the casings 10 and 11 are identical in construction and operation, as will be readily apparent from Fig. 1, and need not therefore be specifically described.

31 represents a positive gear housing or casing substantially cylindrical in form, and equipped with a plurality of suitable frictionless bearings, as will hereinafter be described. The sleeve 30 on the shaft 15 is journaled in an anti-friction bearing $31^a$ in said casing, and has a pinion 32, keyed to the end thereof. The shaft 15 extends beyond the pinion 32 and has keyed thereto a sprocket-wheel 33, and a sliding clutch block or collar 34. Adjacent the clutch-collar 34, the shaft 15 is reduced, forming the stud $15^c$, which has an internal bearing in a stub shaft 35, as clearly shown in Fig. 5. Said stub shaft 35 is journaled in the casing 31, with a suitable frictionless bearing 36, and has keyed thereto, a pinion 37, which is provided upon its face adjacent the clutch 34, with suitable jaws or recesses for engaging said clutch. The protruding end of said stub shaft 35 is tapered as at $35^a$, and threaded at $35^b$, to receive any standard or suitable form of universal joint or bevel gear operative connection (not shown). Journaled in frictionless bearings 38, 39, arranged in said casing 31, below said shaft 15, and running parallel thereto, is a short shaft 40, on which is mounted a free pinion 41, constantly meshing with the pinion 37, and to which is keyed a square-jawed clutch 42 adapted to be engaged by jaws or recesses on the adjacent face of the pinion 41. A sprocket-wheel 43, is splined on the shaft 40, and is connected to the sprocket wheel 33, by a suitable sprocket chain 44, said wheel 43 having jaws adjacent the clutch member 42.

A slip-gear or silent ratchet, consisting of a pinion 45, is mounted on the shaft 40 with a frictionless bearing $45^a$, inclosed in the hub $45^c$, and is provided in one of its side faces with a recessed portion $45^b$, in which is arranged a disk 46, which is keyed to the shaft 40, and is provided with recesses $46^a$, at intervals in which are pivotally mounted pawls 47, each of which is recessed to receive an expansion spring 48, (Fig. 7) the normal tension of which is exerted to keep the free end of the pawl in frictional engagement with the recessed portion or wall $45^b$ of the pinion 45.

The means for controlling the operation of the two clutch members 34 and 42, are shown in Fig. 2 of the drawings and are as follows:—Pivoted to the casing 31, at the points 49 and 50, are two corresponding bell-crank levers 52 and 51, their respective arms $52^a$ and $51^a$ each being provided with a roller bearing 53, which travels in the grooves $34^a$ and $42^a$ of the clutch members 34, 42, respectively. To the outer ends of the other arms of the cranks 51, 52, are pivoted vertical links 54 and 55, the latter extending downwardly and the former extending upwardly, and supporting at their free ends, wheels 57, 56, respectively, which travel on the under and upper sides respectively of a horizontally disposed rod 58, which is provided with a block 58ª, provided upon its upper and under sides with flat cam-like surfaces, as clearly shown in Fig. 2, and which for convenience, are lettered L—N—O—R. Each of the wheels 56, 57, is held against the surfaces of the block 58ª by the coiled expansion springs 60 and 59, which bear against washers 61 and 62, rigidly secured on said links, and against projections 64 and 63, on the interior of the casing 31.

Suitably mounted on the dash (not shown) of the vehicle equipped with my transmission, is a plate 65, a front elevation of which is shown by Fig. 6. A pointer 66 is rotatably mounted on said plate, its stud 66ª passing through the center of same, and supporting at its opposite end, an arm 67, at the free end of which is jointed a connecting link 68, which connects with one arm of a bell-crank lever 69, which is pivotally connected to a suitable support on the body of the vehicle at 70, and the free or other arm of which connects with a series of levers, rods, and cranks not shown, but so arranged as to lead from said bell-crank 69, to said rod 58, so as to impart horizontal movement to the latter when the pointer arm 66 is rotated on the disk 65.

The operation of my automatic transmission is as follows: As the casings 10, 11, 13, are caused to revolve by the driven wheel 8, the thrust wedge rings 20 and 20′ also revolve, and as the weights, 25′ are pivoted to the ring 20′, they are also caused to revolve, and as they revolve, they move outward due to centrifugal force, thereby pressing their extensions 25ª against the bearings 26′, which rotates the disk 28′ against the tension of the spring 27′, until a sufficient centrifugal force is developed to overcome the tension of said spring. The disk 28′ moves along the hub 16′ and causes the wedges 23′ to move outwardly against the beveled surfaces 13ᶜ of the casing 13, and the thrust-wedge ring 20′ causes frictional engagement between the raybestos disks 18, 19, the steel disk 17′ and the flange 11ᵉ. As the pressure increases, these surfaces are caused to grip together until they are all revolving, and as the disk 17′ is revolved, its hub 16′ being in engagement with the squared portion 30ª, will rotate the sleeve 30. As the pinion 32 is keyed to said sleeve 30, it is likewise caused to revolve, which action will drive the slip-gear 45 with which it is in constant mesh, and which when rotated with sufficient speed causes the pawls 47 to move outwardly, and as the surface 45ᵇ is roughened slightly, they grip same and thus cause the disk 46 to revolve, which, being keyed to the auxiliary shaft 40, will also rotate same. The jaw clutch 42 is manually thrown in mesh with the pinion 41 (as will hereinafter be described) and as the shaft 40 is rotated, said pinion 41 is caused to revolve, thereby driving the pinion 37, which being keyed to the shaft 35, causes same to revolve. The clutch 34 is then thrown into mesh with the pinion 37, and as it is keyed to the shaft 15, it will rotate the latter thus rotating the disk 17, and as the weights 25 are pivoted thereto, they are also revolved and forced outwardly by centrifugal action, and as the shaft 35 gains speed, or the road resistance (in the case of an automobile) is overcome; the friction clutch disk 17 starts to operate in the same manner as clutch 17′ previously described, but as this clutch starts to drive the shaft 15, it also drives the gear 37, which in turn drives the pinion 44 faster than the combination of the low gears 32 and 45 could drive it, and then the disk 46 is released from the outer casing 45, by the inaction or non-engagement of the pawls 47, and although these gears are running, they do no work, as the shafts 15 and 35 are connected and running at the speed of the prime mover.

The reversing gear 43 runs loose on the shaft 40, and the gear 33 is keyed to the shaft 15, therefore, by moving the jaw clutch 42 out of mesh with the gear 41, and in mesh with the gear 43, the auxiliary shaft 40, and stub shaft 35, are driven in reverse directions, which action gives the reverse to the automobile drive. Then by disengaging the jaw clutch 34, and keeping the jaw clutch 42 meshed with the pinion 41, the last described frictional clutch 17, may be released continuously for any period; and by disengaging the jaw clutch 34, and moving the jaw clutch 42, to a point of neutral between the gears 41 and 43, there can be no power or force applied to the stub shaft 35. The movement of these jaw clutches described is accomplished by the movement of the lever 66 on the plate 65, thus giving a sliding movement to the member 58, and causing movements to be given the members 54 and 55, respectively. When in the position shown, the lever 66 points to N, and the clutches are in the position known as normal or in the position first described. When the lever is rotated to L, the rollers 56 and 57 take the position shown in dotted lines L′, and impart what is known as a low speed, or in other words, tend to hold the clutch 17 out of engagement. When the lever is rotated to R on the dial, the rollers take the position as indicated by dotted lines R′, and cause a reverse as above described; and when said lever is rotated to O, the rollers take that position as indicated, and impart what is termed as neutral, or a free engine. In this last instance, however, the engine is under the control of a governor, so to speak, and is prohibited from what is termed, racing.

Having thus described my invention what

I claim as new and desire to secure by Letters Patent, is:—

1. In a transmission gearing, a main driven member, casings positively connected with said member, friction clutches mounted in said casings respectively, and comprising friction rings rotatable with said casings, friction disks loosely mounted in said casings, and means adapted to effect frictional engagement between said casings, rings and disks upon said casings rotating at a predetermined speed, shafts passing through said casings and connected respectively with said disks, a third casing, two sets of intermeshing gears mounted in said casing, and means whereby motion is transmitted from said first named shafts to said sets of gears respectively, and means whereby the direction of travel of said gears may be reversed.

2. In a transmission gearing, a main driven member, cylindric casings positively connected with said member, complementary friction clutches arranged in said casings respectively and comprising friction rings, wedge-shaped in cross-section, rotatable with said casings, friction disks loosely arranged in said casings adjacent said rings, and means adapted to effect frictional engagement between said casings, rings and disks upon said casings rotating at a predetermined speed, said means including centrifugally operative devices and springs adapted to neutralize the action of said devices, shafts passing through said casings and connected respectively with said disks, a third casing arranged adjacent the first named casings, and having said shafts journaled therein, a counter-shaft journaled in said third casing, two sets of gears mounted on said shafts, clutches adapted to control the operation of said gears, means for manually operating said clutches, and means for reversing the direction of travel of said gears.

In testimony whereof I affix my signature in the presence of two witnesses.

RAYMOND S. ZEITLER.

Witnesses:
M. A. MILORD,
G. W. HILTABRAND.